(12) United States Patent
Orend

(10) Patent No.: US 8,757,916 B2
(45) Date of Patent: Jun. 24, 2014

(54) METHOD FOR MANUFACTURING A BEARING SHELL ASSEMBLY AND BEARING SHELL ASSEMBLY FOR A BALL JOINT

(75) Inventor: Sven-Helgi Orend, Meerbusch (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/405,948

(22) Filed: Feb. 27, 2012

(65) Prior Publication Data

US 2012/0155952 A1  Jun. 21, 2012

Related U.S. Application Data

(62) Division of application No. 12/348,921, filed on Jan. 6, 2009, now Pat. No. 8,151,464.

(30) Foreign Application Priority Data

Jan. 8, 2008 (DE) .................. 10 2008 003 463

(51) Int. Cl.
*F16C 11/00* (2006.01)
(52) U.S. Cl.
USPC ..................... 403/136; 403/138; 403/144
(58) Field of Classification Search
CPC .................. F16C 11/0642; F16C 11/0652
USPC ......... 403/122, 123–126, 129, 133, 135–138, 403/144
See application file for complete search history.

(56) References Cited

U.S. PATENT DOCUMENTS

| | | | | |
|---|---|---|---|---|
| 2,178,206 A | * | 10/1939 | Katcher | 403/126 |
| 2,973,980 A | * | 3/1961 | Vogt et al. | 403/133 |
| 4,260,275 A | | 4/1981 | Chevallier | |
| 4,527,924 A | * | 7/1985 | Asberg | 403/76 |
| 5,022,779 A | * | 6/1991 | Schnitzler | 403/138 |
| 5,163,769 A | * | 11/1992 | Dresselhouse | 403/27 |
| 5,697,723 A | * | 12/1997 | Wood | 403/135 |
| 5,772,352 A | * | 6/1998 | Fukumoto et al. | 403/144 |
| 6,042,293 A | * | 3/2000 | Maughan | 403/135 |
| 6,254,114 B1 | * | 7/2001 | Pulling et al. | 280/93.511 |
| 6,619,874 B2 | * | 9/2003 | Paduano | 403/137 |
| 7,004,665 B2 | | 2/2006 | Wasylewski et al. | |
| 2009/0010706 A1 | * | 1/2009 | Shimazu et al. | 403/133 |
| 2010/0092235 A1 | * | 4/2010 | Schaumann | 403/132 |

FOREIGN PATENT DOCUMENTS

| | | |
|---|---|---|
| DE | 720912 C | 5/1942 |
| DE | 2838745 A1 | 3/1979 |
| DE | 29616350 U1 | 8/1997 |

(Continued)

OTHER PUBLICATIONS

Search Report for DE 10 2008 003 463.0 prepared Mar. 16, 2009.

*Primary Examiner* — Victor MacArthur
(74) *Attorney, Agent, or Firm* — MacMillan, Sobanski & Todd, LLC

(57) ABSTRACT

A method for manufacturing a bearing shell assembly for a ball joint includes the following steps: a) a bearing shell having a plastic extension is produced; b) a spring element is arranged in a region of the plastic extension; and c) the spring element is fastened to the bearing shell by deformation of the plastic extension. The invention further relates to a bearing shell assembly for a ball joint, including a bearing shell and a spring element, the spring element being non-detachably connected with the bearing shell.

18 Claims, 3 Drawing Sheets

(56) References Cited

FOREIGN PATENT DOCUMENTS

| | | | |
|---|---|---|---|
| DE | 10352121 A1 | 5/2004 | |
| DE | 69914648 T2 | 9/2004 | |
| JP | 10318247 A * | 12/1998 | ............ F16C 11/06 |
| WO | 2008083808 A2 | 7/2008 | |

* cited by examiner

METHOD FOR MANUFACTURING A BEARING SHELL ASSEMBLY AND BEARING SHELL ASSEMBLY FOR A BALL JOINT

CROSS-REFERENCE TO RELATED APPLICATIONS

This application is a divisional of U.S. Ser. No. 12/348,921, filed Jan. 6, 2009, which claimed priority to German Patent Application No. 10 2008 003 463.0 filed Jan. 8, 2008, the disclosures of which are incorporated herein by reference in their entirety.

BACKGROUND OF THE INVENTION

The invention relates to a bearing shell assembly for a ball joint and a method for manufacturing a bearing shell assembly.

Ball joints are generally known from the prior art and are employed, inter alia, in vehicle construction. For example, they are used as radial ball joints and, in that case, must be able to withstand high radial forces along with low axial forces and large tilting angles. The wear occurring over the lifespan of a radial ball joint can lead to the ball joint causing noises during travel, caused by free play in the joint.

In order to prevent the occurrence of this free play, ball joints already exist in which a pre-stressed spring element is arranged between a joint housing and a bearing shell in the composed state of the joint. Through the pre-stressing of the spring element, the bearing shell is acted upon against the ball head of the ball pin, so that even if wear occurs to the bearing shell, a permanent contact exists between the bearing shell and the ball pin, and no free play occurs between the ball head and the bearing shell.

In addition, it is known to provide an extension on the bearing shell, on which the spring element can be pre-mounted. On the one hand, this facilitates a simple and exact positioning of the spring element in the joint housing and, on the other hand, simplifies the assembly of the ball joint.

In the prior art, for example a bearing shell is disclosed (cf. FIG. 1), in which the extension is constructed as a latching element, in order to enter into a snap-on connection with the spring element (not shown). However, specifically in the case of a preferred production of the bearing shell as an integral injection molded plastic part, the construction of the extension as a latching element involves considerable effort. In particular, the provision of notches for the formation of radially movable detent arms and also the forming of an undercut on the detent arms for the formation of radial detent noses at the free end of the extension is complex with regard to injection-molding technique.

It is a feature of the invention to produce a favorably priced, pre-mounted assembly of a bearing shell and a spring element with as little effort as possible.

BRIEF SUMMARY OF THE INVENTION

According to the invention, this feature is achieved by a method for manufacturing a bearing shell assembly for a ball joint, the method including the following steps:
a) a bearing shell having a plastic extension is produced;
b) a spring element is arranged in a region of the plastic extension; and
c) the spring element is fastened to the bearing shell by deformation of the plastic extension.

The connection between the spring element and the bearing shell therefore takes place by a simple deformation of the plastic extension, which can be carried out mechanically with little effort. In return, with regard to injection-molding technique, the complex manufacture of alternative connecting means, such as latching elements for example, is dispensed with.

In a method variant, the bearing shell and the plastic extension are produced as an integral injection-molded part. This integral embodiment permits a particularly favorably priced production of the bearing shell, in particular owing to the fashioning of the plastic extension which is simplified with regard to injection-molding technique.

In step a) the plastic extension is preferably produced as a substantially hollow cylindrical extension having a free axial end. This technical design of the extension makes possible a particularly simple and reliable mechanical deformation at the free axial end.

In a preferred method variant, the spring element is fastened to the bearing shell by cold deformation of the plastic extension. "Cold deformation" in this context designates a deformation which takes place approximately at room temperature, so that a special heating of the plastic extension before deformation is superfluous. This contributes to a production of the bearing shell assembly which is energetic favorable and hence is particularly favorably priced.

The spring element may have an opening for the plastic extension and may be placed onto the bearing shell in step b), such that the spring element surrounds the plastic extension. In this case, a particularly simple and reliable positioning of the spring element on the bearing shell is achieved.

Preferably, with the deformation in step c), an external diameter of the substantially hollow cylindrical plastic extension is widened. A spring element being formed in a suitable manner can be fastened captively, in particular non-releasably, on the bearing shell owing to this widening of the external diameter.

In particular, the spring element may be a plate spring or an assembly of several plate springs.

The invention further relates to a bearing shell assembly for a ball joint, which is preferably produced by the previously described method, with a bearing shell and a spring element, the spring element being non-releasably connected to the bearing shell.

Other advantages of this invention will become apparent to those skilled in the art from the following detailed description of the preferred embodiments, when read in light of the accompanying drawings.

DETAILED DESCRIPTION OF THE INVENTION

Figure 1:
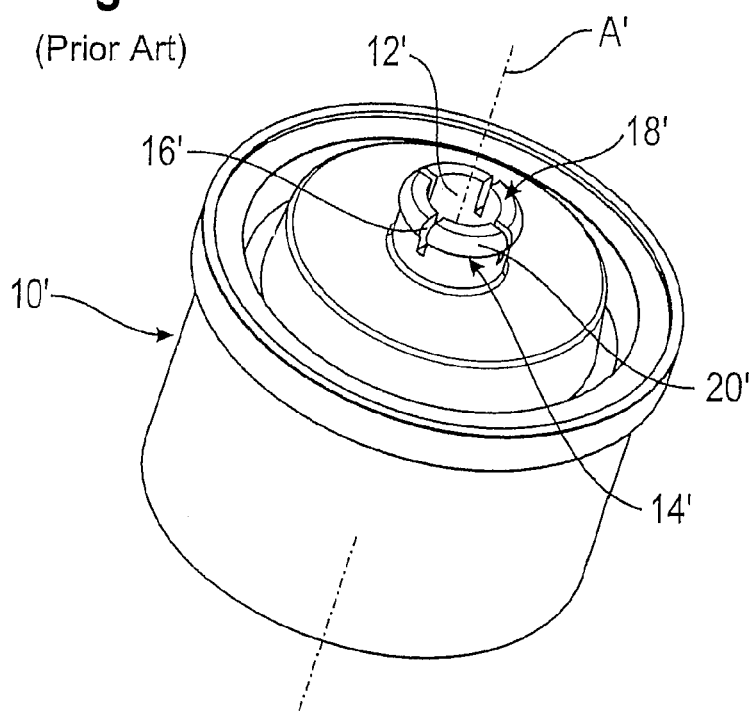
FIG. 1 shows the perspective view of a bearing shell according to the prior art.

FIG. 1 shows a known bearing shell 10' for a ball joint, with a shape which is substantially rotationally symmetrical to a longitudinal axis A'. The bearing shell 10' has an axial extension 12', on which latching elements 14' are formed. The latching elements 14' can enter into a snap-on connection with a spring element (not shown) in order to fasten the spring element to the bearing shell 10', so that a pre-mounted bearing shell assembly is produced. According to FIG. 1, the axial extension 12' is subdivided by notches 16' into four radially movable latching elements 14'. At a free, axial end 18' of the extension 12', each latching element 14' has a formed-on build-up or undercut, which respectively forms a detent nose 20' of the associated latching element 14'.

If a spring element, such as for example a plate spring with a suitable opening, is pressed in the axial direction onto the extension 12', then the latching elements 14' deform radially inwards until the plate spring has passed the detent noses 20'. Thereafter, the elastic latching elements 14' snap radially outwards again, so that the detent noses 20' engage behind an edge of the opening of the plate spring and therefore fasten the plate spring to the bearing shell 10'. Depending on the construction of the latching elements 14', the plate spring can be detached again from the extension 12' by a suitable tool or an axial force, without the bearing shell 10' being damaged or destroyed.

According to FIG. 1, the bearing shell 10' and the extension 12' are produced integrally as a single plastic part, in which the forming-on of the notches 16' and the detent noses 20' involves considerable effort with regard to injection-molding technology.

Figure 2:
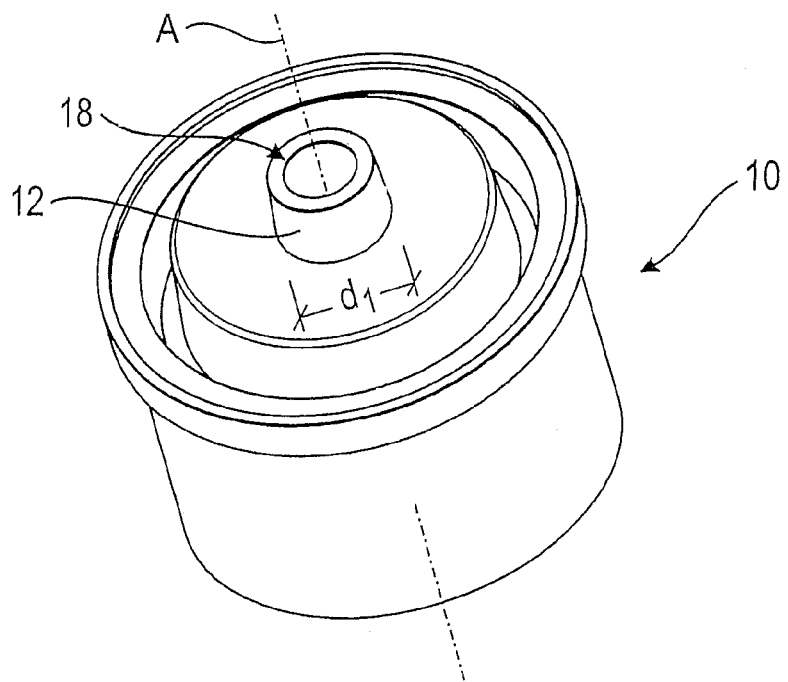
FIG. 2 shows the perspective view of a bearing shell for a bearing shell assembly according to the invention.

FIG. 2 shows a bearing shell 10 which is likewise substantially rotationally symmetrical to a longitudinal axis A, but has an altered axial plastic extension 12, in which this plastic extension 12, compared with the extension 12' according to FIG. 1, is able to be produced in a substantially simpler manner with regard to injection-molding technique. Preferably, the bearing shell 10 and the plastic extension 12 according to FIG. 2 are also produced in a single process step as an integral, favorably priced injection-molded part. The plastic extension 12 is preferably formed as a substantially hollow cylindrical extension having a free axial end 18. In some variant embodiments, an outer side of the extension 12 is not exactly cylindrical, but rather is constructed so as to be slightly conical, such that the extension 20 narrows slightly towards the free end 18. This conical embodiment facilitates the placement of a spring element 22 (cf. FIGS. 3 to 7) and, moreover, simplifies the material deformation in this region owing to the smaller wall thickness at the free end 18 of the extension 12.

The bearing shell 10 according to FIG. 2 constitutes a suitable blank for the production of a bearing shell assembly 23 according to FIG. 5, with the production process of this bearing shell assembly 23 being described in detail below with the aid of FIGS. 3 and 4.

After a manufacture of the bearing shell 10 shown in FIG. 2 in a first process step, the spring element 22 is arranged in the region of the plastic extension 12 in a second process step. Preferably, a plate spring or a plate spring set is used as spring element 22. Basically however, any desired spring element 22 can be used which acts upon the bearing shell 10 in the desired manner when subsequently employed in a ball joint 34 (cf. FIGS. 6 and 7).

Figure 3:
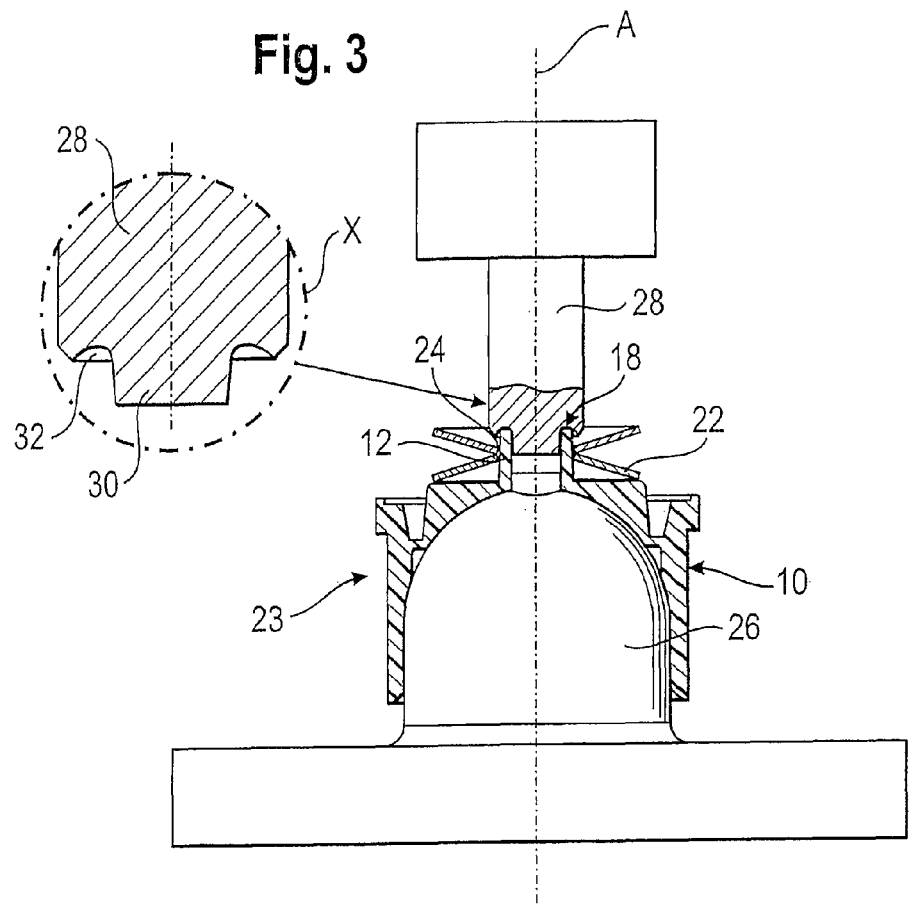
FIG. 3 shows a diagrammatic section through the bearing shell according to FIG. 2 with a spring element fitted in place, the bearing shell being clamped into a deformation tool.

In the present example, the spring element 22 includes two plate springs with respectively a central, approximately circular opening 24, a diameter of the opening 24 being slightly larger than an external diameter $d_1$ of the substantially hollow cylindrical plastic extension 12 (cf. FIGS. 2 and 3). Accordingly, the spring element 22 can be placed onto the plastic extension 12 and is thereby already largely fixed in a radial direction.

In a further, third process step, the spring element 22 is fastened on the bearing shell 10 by deforming the plastic extension 12. This process step is illustrated diagrammatically in FIG. 3. In actual terms, firstly the bearing shell 10 on its side facing away from the extension 12 is turned over a form 26 which serves as an abutment. Then a pressure stamp 28 is supplied in the axial direction, the pressure stamp 28 engaging at the free end 18 of the plastic extension 12. The shape of the pressure stamp 28 in the contact region with the plastic extension 12 is illustrated precisely on the left-hand side of FIG. 3 by means of a section detail X. A stamp extension 30, which narrows conically towards a free end of the pressure stamp 28, engages into the hollow cylindrical plastic extension 12 of the bearing shell 10 and widens the extension slightly by applying axial pressure. Finally, the free end 18 of the extension 12 abuts onto a rounded, encircling guide channel 32 of the pressure stamp 28, which deforms the plastic material at the free end 18 of the extension 12 radially outwards such that an encircling build-up 33 is formed. In other words, the external diameter of the substantially hollow cylindrical plastic extension 12 is widened during the deformation by the pressure stamp 28. In the present example, the external diameter is increased in the region of the free end 18 from a value $d_1$ to a value $d_2$ (cf. FIGS. 2 and 6).

With the deformation of the plastic extension 12 in this third process step, it is particularly important that the longitudinal axes of the form 26, the pressure stamp 28 and the bearing shell 10 are precisely in alignment, so that a uniform deformation takes place, viewed in a peripheral direction.

Figure 4:
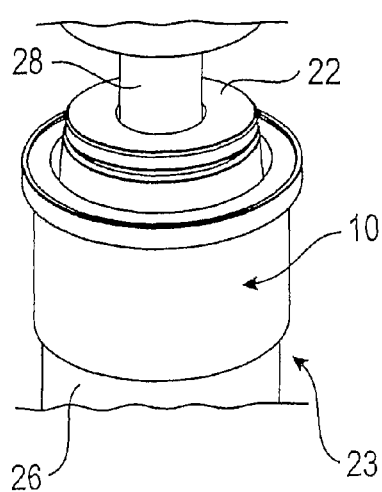
FIG. 4 shows a perspective view of the bearing shell according to FIG. 2 with a spring element fitted in place, the bearing shell being clamped into a deformation tool.

FIG. 4 shows a perspective view during the process which is illustrated according to FIG. 3 in a diagrammatic longitudinal section. Here, the bearing shell 10 is turned over the form 26 and the spring element 22 is placed onto the extension 12 of the bearing shell 10. Furthermore, the pressure stamp 28 is already placed onto the free end 18 of the extension 12 and is acted upon against the form 26. After the deformation of the free end 18, the pressure stamp 28 moves away again in the axial direction and the bearing shell assembly 23 can be taken from the form 26. Through the deformation of the free end 18, the spring element 22 is now fastened both in radial and axial direction on the bearing shell 10. In addition to the spring element 22, of course further components such as for example a washer 35 (cf. FIG. 6) can also be fastened on the bearing shell 10 by the described method.

Depending on the boundary conditions during the manufacturing process, in the finished bearing shell assembly 23 the spring element 22 is possibly rotatable relative to the bearing shell 10 about the axis A and/or has a slight axial play. However, as the objective was the (in particular radial) positioning of the spring element 22 relative to the bearing shell 10 and the non-releasable fastening of the spring element 22 on the bearing shell 10, these movement possibilities in no way restrict the operability of the bearing shell assembly 23 and are therefore negligible.

Figure 5:
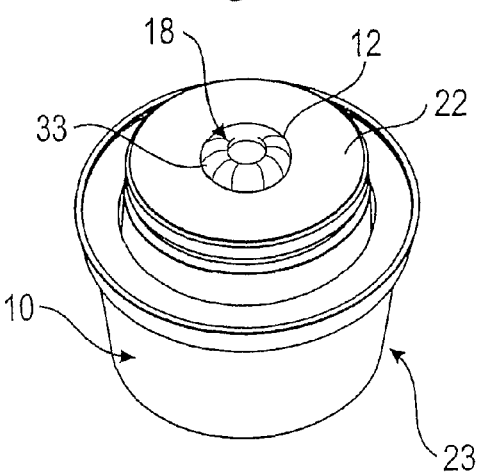
FIG. 5 shows a perspective view of a bearing shell assembly according to the invention.

FIG. 5 shows a perspective view of the pre-mounted bearing shell assembly 23, which has been manufactured by the method described above. The bearing shell assembly 23 includes the bearing shell 10 and the spring element 22, the spring element 22 being non-releasably connected with the bearing shell 10. In this case, the connection is defined as being non-releasable because the spring element 22 can not be detached from the bearing shell 10 without destroying or at least damaging the extension 12.

To produce at least the extension 12, preferably the entire bearing shell 10, plastics (in particular thermoplastics) are used, which are suitable for a permanent plastic deformation. In a variant embodiment, the deformation takes place at raised temperatures, which is designated as so-called hot deformation. However, in particularly preferred variant embodiments, the spring element 22 is fastened to the bearing shell 10 by so-called cold deformation, i.e. cold overstretching of the plastic extension 12. During cold deformation, the plastic material is deformed beyond the linear-elastic range, up to close to the yield point. The deformation in this so-called entropy-elastic or plastic range is maintained substantially permanently, so that the spring element 22 is reliably fastened on the bearing shell 10.

Figure 6:
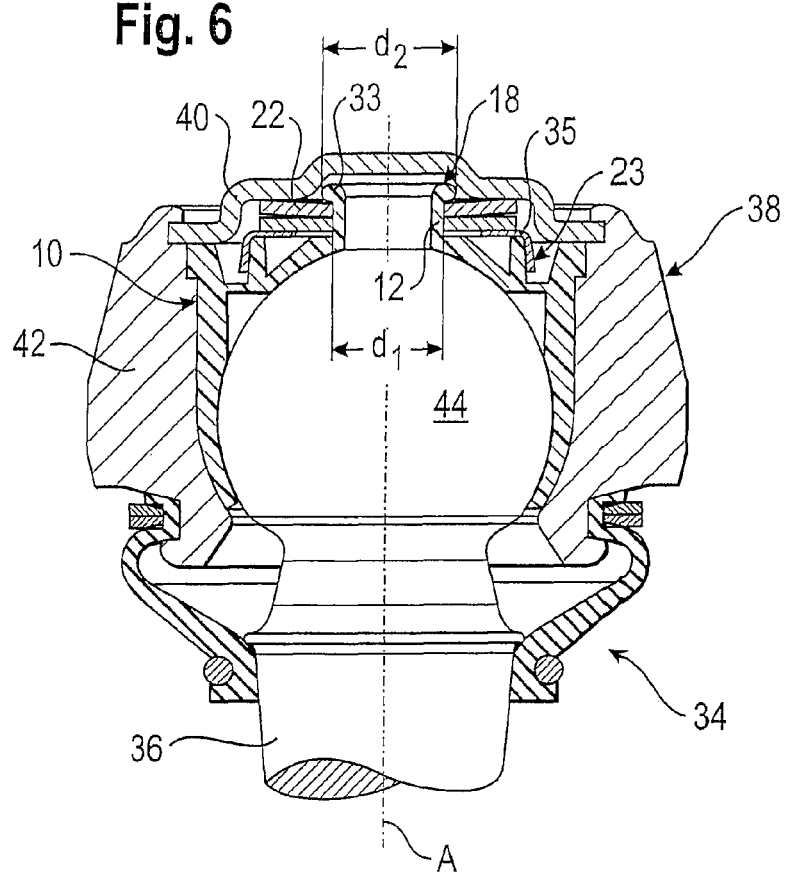
FIG. 6 shows a longitudinal section through a ball joint with a bearing shell assembly according to the invention.

FIG. 6 shows a ball joint 34 with a ball pin 36, a joint housing 38 and the bearing shell assembly 23 described above. In the present case, the joint housing 38 includes a housing cover 40 and a peripheral wall 42 on which the housing cover 40 is fastened. The bearing shell assembly 23 is accommodated inside the joint housing 38 and surrounds a ball head 44 of the ball pin 36, which likewise extends into the interior of the housing. In this assembled state of the ball joint 34, it becomes clear that the spring element 22 can be pre-stressed by the placement of the housing cover 40. Through the pre-stressing of the spring element 22, the bearing shell 10 is pressed against the ball head 44 of the ball pin 36, so that even when wear occurs to the bearing shell 10, a permanent contact exists between the bearing shell 10 and the ball pin 36 and no free play occurs between the ball head 44 and the bearing shell 10.

Figure 7:
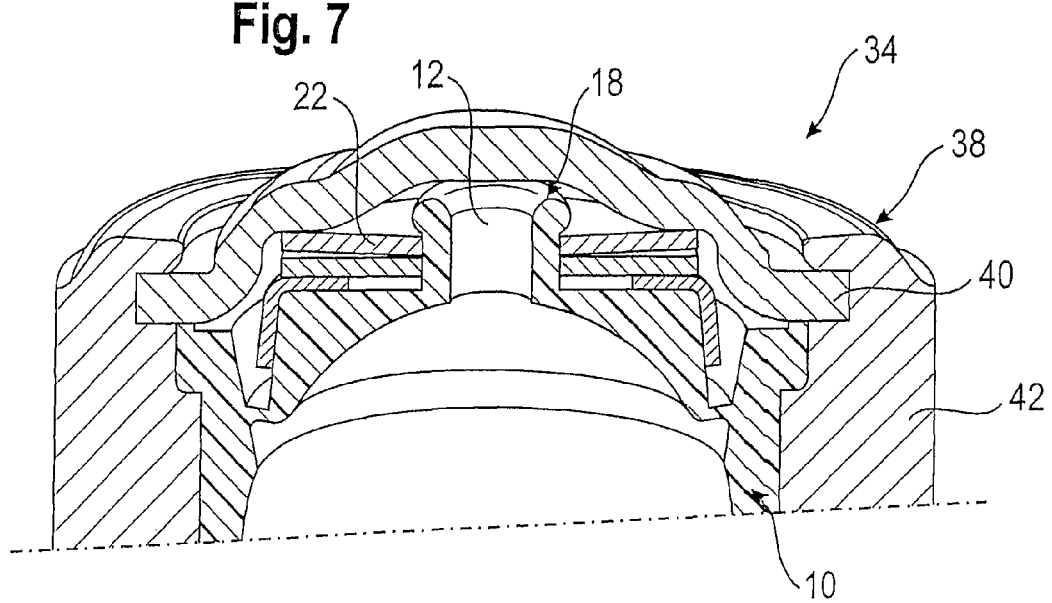
FIG. 7 shows a detail section through the ball joint according to FIG. 6 in the region of a plastic extension of the bearing shell assembly according to the invention.

FIG. 7 shows a detail of the ball joint 34 according to FIG. 8 in the region of the axial plastic extension 12. The widened external cross-section $d_2$ at the free end 18 of the plastic extension 12, which provides for a captive, in particular non-releasable connection between the bearing shell 10 and the spring element 22 can be readily seen here.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A ball joint comprising:
a ball joint housing;
a bearing shell disposed in the housing and having a plastic extension; and
a spring element arranged in a region of the plastic extension, wherein an outer circumference of the spring element is free and radially spaced from the ball joint housing, wherein the spring element includes an opening for receiving the plastic extension, wherein the opening defines a continuous and non-deformable inner diameter, wherein the spring element is a plate spring or an assembly of several plate springs;
wherein a free axial end of the plastic extension, which is not within the region of the spring element includes a continuously encircling non-deformable build-up which defines a first external diameter, and the plastic extension, which is directly adjacent the free axial end and within the region of the spring element defines a second external diameter which is less than the first external diameter to thereby non-releasably fasten the spring element to the bearing shell only in the region of the plastic extension of the bearing shell which is directly adjacent the free axial end thereof.

2. The ball joint of claim 1, wherein the bearing shell and the plastic extension are produced as an integral injection-molded part.

3. The ball joint of claim 1, wherein the plastic extension is a substantially hollow extension.

4. The ball joint of claim 1, wherein the continuously encircling build-up of the free axial end is formed during a deformation process and prior to the deformation process an outer side of the free axial end is conical.

5. The ball joint of claim 1, wherein the continuously encircling build-up of the free axial end is formed during a deformation process.

6. The ball joint of claim 1, wherein the spring element is fastened to the bearing shell by one of a hot deformation or a cold deformation of the plastic extension.

7. The ball joint of claim 1, wherein the inner diameter of the opening of the spring element is slightly larger than the second external diameter of the plastic extension of the bearing shell.

8. A ball joint comprising:
a ball joint housing;
an injection-molded bearing shell disposed in the housing and having an integral substantially hollow plastic extension having a free axial end; and
a spring element arranged in a region of the plastic extension, wherein an outer circumference of the spring element is free and radially spaced from the ball joint housing, wherein the spring element includes an opening for receiving the plastic extension, wherein the opening defines a continuous and non-deformable inner diameter, wherein the spring element is a plate spring or an assembly of several plate springs;
wherein the free axial end of the plastic extension, which is not within the region of the spring element includes a continuously encircling non-deformable build-up which defines a first external diameter, and the plastic extension, which is directly adjacent the free axial end and within the region of the spring element defines a second external diameter which is less than the first external diameter to thereby non-releasably fasten the spring element to the bearing shell only in the region of the plastic extension of the bearing shell which is directly adjacent the free axial end thereof.

9. The ball joint of claim 8, wherein the continuously encircling build-up of the free axial end is formed during a deformation process and prior to the deformation process an outer side of the free axial end is conical.

10. The ball joint of claim 8, wherein the spring element is fastened to the bearing shell by one of a hot deformation or a cold deformation of the plastic extension.

11. The ball joint of claim 8, wherein the inner diameter of the opening of the spring element is slightly larger than the second external diameter of the plastic extension of the bearing shell.

12. A ball joint comprising:
a ball joint housing;
an injection-molded bearing shell disposed in the housing and having an integral substantially hollow plastic extension; and
a spring element arranged in a region of the plastic extension, wherein an outer circumference of the spring element is free and radially spaced from the ball joint housing, wherein the spring element includes an opening for receiving the plastic extension, wherein the opening defines a continuous and non-deformable inner diameter, wherein the spring element is a plate spring or an assembly of several plate springs;

wherein a free axial end of the plastic extension, which is not within the region of the spring element includes a continuously encircling build-up which defines a first external diameter, the build-up formed by one of a hot deformation or a cold deformation process, and the plastic extension, which is directly adjacent the free axial end and within the region of the spring element defines a second external diameter which is less than the first external diameter to thereby non-releasably fasten the spring element to the bearing shell only in the region of the plastic extension of the bearing shell which is directly adjacent the free axial end thereof.

13. The ball joint of claim 12, wherein the plastic extension has a substantially hollow extension.

14. The ball joint of claim 13, wherein prior to the forming of the continuously encircling build-up of the free axial end by the one of the hot deformation or the cold deformation process, an outer side of the free axial end is conical.

15. The ball joint of Claim 12, wherein the inner diameter of the opening of the spring element is slightly larger than the second external diameter of the plastic extension of the bearing shell.

16. A ball joint comprising:
a ball joint housing;
a bearing shell disposed in the housing and having a plastic extension;
a spring element arranged non-releasably in a region of the plastic extension, wherein an outer circumference of the spring element is free and radially spaced from the ball joint housing, wherein the spring element includes an opening for receiving the plastic extension, wherein the opening defines a continuous and non-deformable inner diameter; and
a housing cover fastened to the ball joint housing;
wherein the spring element is prestressed between the housing cover and the bearing shell; and
wherein a free axial end of the plastic extension, which is not within the region of the spring element includes a continuously encircling non-deformable build-up which defines a first external diameter, and the plastic extension, which is directly adjacent the free axial end and within the region of the spring element defines a second external diameter which is less than the first external diameter to thereby non-releasably fasten the spring element to the bearing shell only in the region of the plastic extension of the bearing shell which is directly adjacent the free axial end thereof.

17. The ball joint of claim 16 wherein the plastic extension is substantially hollow.

18. The ball joint of claim 17 wherein the continuously encircling build-up of the free axial end is formed during a deformation process and prior to the deformation process an outer side of the free axial end is conical.

* * * * *